Dec. 27, 1966 E. A. JENSEN ET AL 3,293,981

TAPE READ-OUT DEVICE

Filed Feb. 27, 1964

INVENTOR.
Evan A. Jensen
BY Russel D. Cross
Pendleton, Neuman, Seibold & Williams
Attorneys

United States Patent Office 3,293,981

Patented Dec. 27, 1966

3,293,981

TAPE READ-OUT DEVICE

Evan A. Jensen, San Carlos, and Russel D. Cross, Redwood City, Calif., assignors to United Air Lines, Chicago, Ill., a corporation of Delaware Filed Feb. 27, 1964, Ser. No. 347,956

9 Claims. (Cl. 88—24)

This invention relates to a transcribing apparatus and more particularly to an apparatus for transcribing information from a record tape of the type customarily used in modern flight recorder systems with which substantially all commercial aircraft are equipped. The purpose of such flight recorder systems is to produce a continuous record of altitude, air speed, course, etc., which may be subsequently inspected to determine the position and attitude of the aircraft at any given time. Analysis of the flight recorder tape also is helpful in determining the causes of an accident, by helping to reconstruct the circumstances immediately prior thereto.

The record material which is ordinarily used in flight recorders is in the form of a metal foil, and the foil is moved past a plurality of styli, one for each of the parameters to be recorded. Each stylus moves in accordance with its parameter in a direction transverse to the direction of movement of the foil and traces a curve or graph of its respective parameter, with a longitudinal time base on the foil, by embossing or grooving the curve into the surface of the foil. This type of record tape has the advantage of producing a permanent flight record, but it is difficult to interpret the record on the tape, due to the glossy or specular surface of the foil which confuses attempts to extract the recorded information visually, and creates a poor contrast image which does not photograph well. In addition, the metal foil is not usually provided with any markings or other indications by which the magnitude of a curve at any given point may be calibrated. Therefore, in reading the information embossed on the foil, it is ordinarily necessary to measure the distance from the edge of the foil to each point on the curve, in order to convert the relative indications of the graph into absolute quantities of altitude, air speed, or the like.

It is, therefore, an important object of the present invention to provide apparatus for photographing a curve embossed on a specular surface.

Another object of the present invention is to provide apparatus by which an image of a curve embossed on a specular surface may be photographed in superposition with a calibrating grid, so that the meaning of the curve may be interpreted with reference to absolute values of magnitude.

Other and further objects of the present invention will become apparent upon an examination of this specification and the accompanying claims and drawings.

In accordance with one embodiment of the present invention, there is provided apparatus for photographically reproducing an information pattern recorded in the form of a groove in the surface of a specular record medium. The apparatus includes means for supporting the surface of the record medium in a single plane or smooth configuration, and means for illuminating the surface of the record medium with a plurality of light sources having acute angles of incidence with the surface. Light impinging on the embossed portions of the surface, at the sides of the groove, is scattered and light impinging on the smooth portions of the surface is reflected at an angle of reflection equal to said angle of incidence. Optical means is provided for catching and focusing only the scattered light upon the film, whereby the image photographed on the film is a high contrast image of the groove.

Reference will now be made to the drawings in which.

Figures 1, 2, 3, 4, 5:
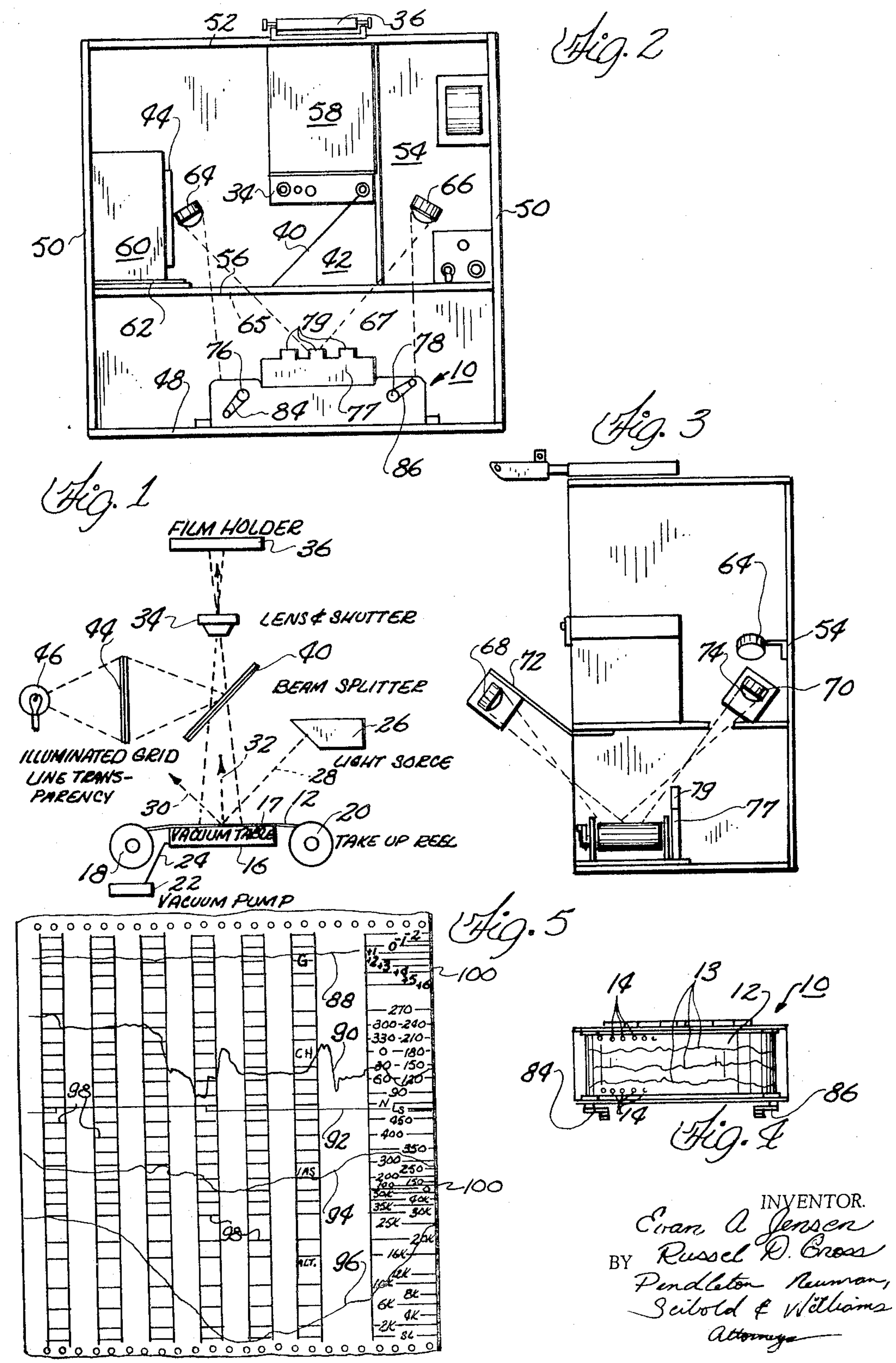
FIG. 1 is a functional block diagram of apparatus constructed in accordance with the present invention.
FIG. 2 is a front elevation of apparatus constructed in accordance with the present invention.
FIG. 3 is a side elevation of the apparatus of FIG. 2.
FIG. 4 is a plan view of apparatus associated with the apparatus of FIGS. 2 and 3, for supporting the record tape so that the embossed surface lies in substantially a single plane.
FIG. 5 is an illustration of a photograph obtained with the apparatus of FIGS. 2 to 4.

Referring now to the drawings, the record tape having embossed information which is to be photographed is illustrated in FIG. 4 as it is held in position in supporting apparatus 10. The foil tape 12 is embossed with three curves 13, and is provided with equally spaced sprocket holes 14 along both sides of the tape, by which it may be advanced in position along the supporting mechanism 10 by a conventional drive having wheels (not shown) with teeth engaging the holes 14. The foil tape 12 passes from a supply reel 18 to a take-up reel 20 over the surface of a vacuum table 16 (FIG. 1).

A vacuum pump 22 is provided with a vacuum line 24 communicating between the pump and the vacuum table 16. The vacuum table 16 comprises a hollow compartment which is airtight except for a plurality of apertures in a wall 17 of the table adjacent the foil tape 12. The effect of the vacuum within the hollow table is to draw down the tape 12 into close association with the wall 17 of the table 16, to maintain the foil tape 12 in substantially a single plane, parallel to the plane of the surface of the wall 17.

Located above the table and spaced horizontally therefrom are light sources 26, which are adapted to produce a relatively narrow beam of light directed at the foil supported on the vacuum table 16 along the line 28 forming an acute angle with the plane of the foil tape 12. The light from the sources 26 which falls upon unembossed portions of the foil tape 12 is reflected along the path 30, the angle of reflection of which is the same as the angle of incidence of the path 28. The light falling within the grooved or embossed portions of the foil tape 12, however, is scattered, and some of this light is reflected along the path 32, and is intercepted by a lens and shutter mechanism 34. The lens focuses the light in the path 32 onto the surface of film contained in a film holder 36, while the shutter is adapted to be open long enough properly to expose the film in the film holder 36.

Between the vacuum table 16 and the lens and shutter mechanism 34, there is disposed a beam splitter 40 which is adapted to transmit a portion of the light falling on it along the path 32. The beam splitter 40 is disposed at an attitude of 45° with respect to the path 32, and also 45° with respect to the path of light transmitted through a transparency 44, which is illuminated by a lamp 46. The transparency 44 contains a plurality of calibration grid lines which are superimposed upon the image of the curves 13 so that both the curves 13 and the calibration grid may be photographed together to facilitate interpretation of the curves 13. The light passing through the transparency 44 is partially reflected by the beam splitter 40, and such reflected light passes through the lens and shutter assembly 34 to expose the film in the film holder 36 simultaneously and in register with the light traveling along the path 32.

The function of the beam splitter 40 is to permit the exposure of the film in the film holder 36 to light from two different sources. The beam splitter 40 transmits about 60% of the light impinging on it while reflecting about 35%. Thus the film in the film holder 36 is exposed with about 60% of the light from the foil tape 12 and about 35% of the light from the transparency 44. The 60–35 ratio of transmitted-to-reflected light is desirable because relatively little light is scattered from the grooves in the foil 12, compared to the total light falling on the foil tape 12, due to the relatively small proportion of space occupied by the grooves of the curves 13. By selecting a ratio of transmitted-to-reflected light which favors transmitted light, the relative intensity of the curves 13 at the film is made greater, while the relative intensity of the grid lines of the transparency 44 is reduced. The relative intensities may be further adjusted by controlling the voltage applied to the lamp 46 which illuminates the transparency 44.

In FIG. 2 a front elevation of the apparatus is illustrated. The framework of the apparatus comprises a bottom wall 48, a pair of side walls 50 and a top wall 52. A rear wall 54 is secured to the side walls 50, the bottom wall 48, and the top wall 52 in light-tight relationship. A shelf wall or member 56 extends between the two side walls 50, and is supported thereby. A film holder 36 is disposed on the top wall 54 overlying an aperture therein, and is accessible from the front of the apparatus to permit changing the film in the film holder 36.

Immediately below the film holder 36 and secured to the top wall 52 is a light-tight compartment 58. The lens and shutter mechanism 34 are mounted at the lower end of the compartment 58. The beam splitter 40 is mounted on a frame 42 supported on the shelf member 56, over an aperture therein, and is disposed directly below the lens and shutter mechanism 34. The support mechanism 10 is disposed on the bottom wall 48 directly below the beam splitter 40. The compartment 58, together with the film holder 36 and the lens and shutter mechanism 34, form a camera by which the image of the curves 13 may be photographed.

A light-tight box 60 is movably mounted on a horizontal track 62 supported by the shelf member 56, the box 60 having an opening in its inward wall over which the transparency 44 is mounted. The box 60 is manually adjustable in position along the track 62, in order to focus the image of the transparency 44 on the film 36, and for any setting of the lens and shutter mechanism 34.

A pair of lamps 64 and 66 are mounted on the rear wall 54, and are positioned to direct beams of light onto the surface of the foil tape 12, from the left rear and the right rear of the apparatus, through a pair of apertures 65 and 67 in the shelf member 56, as indicated by the dashed lines leading from the lamps 64 and 66.

Two additional lamps 68 and 70 are mounted on a pair of brackets 72 and 74 respectively, and are adapted to direct beams of light onto the surface of the foil 12 from front and rear directions, respectively. The rear lamp 70 directs its beam of light through an aperture 75 in the shelf member 56.

As illustrated in FIGS. 2 and 3, the front lamp 68 illuminates the front part of the foil tape 12, the rear lamp 74 illuminates the midportion of the foil tape 12, and the side lamps 64 and 66 illuminate opposite portions of the rear of the foil 12. Each of the lamps illuminates overlapping areas of the foil tape 12, to ensure that all areas of the foil tape 12 are illuminated.

Each of the lamps 64, 66, 68 and 70 is located above the plane of the foil 12 and spaced horizontally therefrom such that the beam of light directed onto the foil by each of the lamps 64, 66, 68 and 70 has an angle of incidence of approximately 35° to 55° with the plane of the foil 12. The preferred angle of incidence is 45°.

A mask 77 is provided at the rear of the foil supporting apparatus 10, and shields the rear portion of the foil tape 12 from illumination by the lamp 70. This limits the angle of incidence of light from the lamp 70 to approximately 45°. Were it not for the mask 77, the light falling on the rear portion of the foil tape 12 would have a higher angle of incidence. The mask 77 is provided with a plurality of rectangular protuberances 79 to prevent the formation of a straight line shadow on the foil tape 12 which might tend to obscure the desired information.

As has been noted with respect to the diagrammatic illustration of FIG. 1, the light from each of the lamps 64, 66, 68 and 70, which falls on unembossed portions of the foil 12 is reflected at an angle of reflectance substantially equal to the angle of incidence, and does not reach the film 36. However, light falling on the embossed grooves in the surface of the foil 12 is scattered and some of this light reaches the film 36 through the lens and shutter mechanism 34.

The foil support 10 includes a pair of spools which are connected to transverse rods 76 and 78 journaled in the vertical side walls 80 and 82 of the film holder 10. Each of the rods 76 and 78 is provided with a crank handle 84 and 86, respectively, whereby the spools may be rotated in one direction or the other, thereby to select a particular portion of the foil 12 to be photographed. One or both of the crank handles may be replaced, if desired, by a motor providing the torque necessary to move the foil tape 12 against the frictional force produced by the vacuum in box 16.

In FIG. 5, there is illustrated a composite photograph including a plurality of curves. The curve 88 represents acceleration or "G" forces acting on the aircraft. The curve 90 indicates the bearing of the aircraft, with respect to an east-west parallel, while the curve 92 indicates the sense of the course curve, or the heading of the aircraft in a direction north or south of the east-west parallel. The curve 94 represents indicated air speed, while the curve 96 represents altitude. A scale 100 for each curve appears on the right side of the photograph, and dashed horizontal grid lines 98 appear over the remainder of the photograph, aligned with various portions of the scale. Vertical grid lines are provided to designate equal time intervals the duration of which depends upon the speed at which the foil moves when being recorded. The horizontal grid lines are dashed with approximately even spaces between successive dashes to provide a clear view of the curves in the spaces between the dashes, but to provide adequate scale information for reading and interpolating the curves. The portions of the curve appearing on the right side of the photograph are partially obscured by the scale, but this portion of the curves may be more clearly viewed in another photograph taken after the foil 12 has been shifted to the left by turning an appropriate one of the crank handles 84 or 86.

Although the apparatus has been particularly described with respect to a lens and shutter mechanism 34 which forms, in effect, a still camera, it will be appreciated that this apparatus may be replaced by a movie camera or the like which takes successive and overlapping photographs of the entire foil record, as the foil is moved from the supply reel to the take-up reel.

The foregoing will so fully and completely describe the present invention that others may, by applying current knowledge, readily adapt the same for use under varying conditions of service without departing from the essential features of novelty involved, which are intended to be defined and secured by the following claims.

What is claimed is:

1. Apparatus for photographically transcribing data which has been permanently recorded in the form of constant depth grooves in the surface of a record medium, comprising means for supporting said record medium whereby said surface lies smooth, means for illuminating said surface with light having a substantially constant angle of incidence with said surface, whereby light impinging on the grooved portions of said surface is scattered, a photographic film, and optical means for focusing only said scattered light upon said film.

2. Apparatus for photographically transcribing data which has been permanently recorded in the form of a constant depth embossed pattern on a reflectant surface, comprising means for illuminating said pattern with light having a substantially constant angle of incidence with said surface, and focusing means for focusing only light reflected from said pattern having an angle of reflection of substantially a right angle with respect to said surface to form an optical image of said pattern.

3. Apparatus for photographically transcribing data which has been permanently recorded in the form of a constant depth groove in a specular surface, comprising means for illuminating said surface with light having an acute angle of incidence of 35° to 55° with respect to said surface, and focusing means for receiving light reflected from said groove substantially normal to said surface and focusing said light into an optical image.

4. Apparatus for forming an optical image corresponding to a constant depth pattern grooved into the surface of a strip of metal foil, comprising a vacuum table for supporting said portion of said foil in a single plane, a plurality of spaced apart lamps spaced vertically and horizontally from said plane to illuminate different portions of said surface with light having an acute angle of incidence, and a camera spaced from said plane in a direction normal to said surface, said camera having focusing means interposed between said surface and a photographic film to focus light reflected from said pattern in a direction normal to said surface on said film.

5. Apparatus according to claim 4, wherein the portions of said surface illuminated by said lamps overlap.

6. Apparatus according to claim 4, including means for limiting said angle of incidence to approximately 45°.

7. Apparatus for forming a combined optical image of a recorded pattern and a standard pattern, said recorded pattern being formed by a constant depth groove in a specular surface, comprising means for illuminating said surface with light having an acute angle of incidence of approximately 45° with said surface whereby only light reflected from said groove is reflected in a direction substantially normal to said surface, transmitting-reflecting means spaced from said surface for transmitting a portion of said light reflected in a direction normal to said surface and for reflecting a portion of said light, an object spaced from said transmitting-reflecting means having said standard pattern recorded thereon, means for illuminating said object, said transmitting-reflecting means reflecting a portion of the light from said object along a path coincident with the path of said transmitted light and for transmitting another portion of said light, and focusing means for receiving said transmitted and reflected light and for forming a combined image of said recorded pattern and said standard pattern.

8. The combination comprising an object having a standard pattern recorded thereon, a specular record medium having a pattern recorded thereon in the form of a constant depth groove in the surface of said record medium, means for illuminating said recorded pattern and said standard pattern, means for combining ligth from said recorded pattern and light from said standard pattern, photographic film means spaced from said combining means, and means for focusing said light from said standard pattern and said light from said recorded pattern upon said photographic film means to simultaneously produce a combination photograph of said recorded and standard patterns.

9. Apparatus for making a photographic reproduction of a pattern recorded by a constant depth groove in a plane specular surface, comprising means for illuminating said surface and one side of said groove with a beam of light, focusing means spaced from said surface for receiving and forming an optical image of light reflected from the side of said groove in a direction non-parallel with said beam and non-parallel with light from said beam reflected from plane portions of said surface, a transparency of a standard grid pattern, a light source for transmitting light through said transparency to said focusing means, said focusing means focusing an optical image of said recorded pattern and said standard grid pattern in the same plane.

References Cited by the Examiner

UNITED STATES PATENTS

| | | | |
|---|---|---|---|
| 2,765,211 | 10/1956 | Brinster et al. | 346—107 |
| 3,176,306 | 3/1965 | Burns | 346—107 X |
| 3,210,466 | 10/1965 | Day | 346—77 X |

NORTON ANSHER, *Primary Examiner.*

RICHARD A. WINTERCORN, *Assistant Examiner.*